(12) United States Patent
Nguyen et al.

(10) Patent No.: US 7,251,881 B2
(45) Date of Patent: Aug. 7, 2007

(54) METHOD OF DELIVERING GEOMETRIC STRESS RELIEF ELEMENT TO HIGH VOLTAGE CABLE TERMINATIONS

(75) Inventors: Nga K. Nguyen, Austin, TX (US); Todd H. Richardson, Austin, TX (US); William L. Taylor, Round Rock, TX (US); Ming Zhang, Shanghai (CN)

(73) Assignee: 3M Innovative Properties Company, St. Paul, MN (US)

( * ) Notice: Subject to any disclaimer, the term of this patent is extended or adjusted under 35 U.S.C. 154(b) by 386 days.

(21) Appl. No.: 10/964,956

(22) Filed: Oct. 14, 2004

(65) Prior Publication Data

US 2006/0080831 A1    Apr. 20, 2006

(51) Int. Cl.
*H01R 43/00* (2006.01)
(52) U.S. Cl. .............. 29/825; 29/631; 29/828; 29/887; 174/73.1; 174/75 R
(58) Field of Classification Search .............. 29/825, 29/828, 887, 631; 174/73.1, 75 R
See application file for complete search history.

(56) References Cited

U.S. PATENT DOCUMENTS

| | | | |
|---|---|---|---|
| 3,210,460 A * | 10/1965 | Suelmann | 174/73.1 |
| 3,515,798 A | 6/1970 | Sievert | |
| 3,796,821 A | 3/1974 | Lusk | |
| 3,808,352 A * | 4/1974 | Johnson | 174/73.1 |
| 4,389,440 A | 6/1983 | Keith | |
| 4,503,105 A | 3/1985 | Tomioka | |
| 4,517,407 A * | 5/1985 | Fox et al. | 174/73.1 |

(Continued)

FOREIGN PATENT DOCUMENTS

EP    0 840 422 A2    5/1998

(Continued)

OTHER PUBLICATIONS

U. S. Application entitled "Modular Skirt Systems and Method of Using", filed Oct. 14, 2004, having a U.S. Appl. No. 10/965,645.

(Continued)

*Primary Examiner*—Carl J. Arbes
(74) *Attorney, Agent, or Firm*—David J. Shenk

(57) ABSTRACT

A method for delivering a geometric type stress relief element to a terminated electrical cable is provided. The cable contains a conductor surrounded by at least one coaxial layer of insulator, semiconductor, grounded wires and cable jacket. First, the terminated cable is tapered to expose a portion of the conductor so as to protrude beyond the insulation, which protrudes beyond semiconductor, which protrudes beyond the conductive wires. A geometric stress cone is preloaded onto a cold shrink tube. The terminated, tapered cable is inserted into the cold shrink tube. The cold shrink tube is removed and the geometric stress cone collapses onto the tapered cable. The cable is rated for supplying high voltage.

20 Claims, 2 Drawing Sheets

U.S. PATENT DOCUMENTS

| | | | | |
|---|---|---|---|---|
| 4,757,159 A | * | 7/1988 | Dejean | 174/73.1 |
| 4,871,599 A | | 10/1989 | Knorr | |
| 4,934,227 A | | 6/1990 | Knorr | |
| 5,280,136 A | | 1/1994 | Yaworski et al. | |
| 5,670,223 A | | 9/1997 | Sadlo et al. | |
| 5,925,427 A | | 7/1999 | Sadlo et al. | |
| 6,342,679 B1 | * | 1/2002 | Portas et al. | 174/209 |
| 6,576,846 B2 | * | 6/2003 | Portas et al. | 174/209 |

FOREIGN PATENT DOCUMENTS

| | | |
|---|---|---|
| GB | 1 409 632 | 10/1975 |
| JP | 08023621 | 1/1996 |

OTHER PUBLICATIONS

ABB Kabeldon product description 52-420 kV; Outdoor Termination, Porcelain 12-84kV, APED; 2002 Edition 1, pp. 68-69.

Raychem; Product Installation Instructions; "GHVT Series Terminations 69kV Class High Voltage Termination for Copper Tape/Wire Shield or Lead Sheath Cable"; Raychem, Tyco Electronics-Energy, 8000 Purfoy Road, Fuquay-Varina, NC 27526; PCN 931167-000; Jan. 13, 2000; pp. 1-9.

* cited by examiner

METHOD OF DELIVERING GEOMETRIC STRESS RELIEF ELEMENT TO HIGH VOLTAGE CABLE TERMINATIONS

CROSS REFERENCE TO RELATED APPLICATION

The present invention is related to U.S. patent application Ser. No. 10/965,645 entitled "MODULAR SKIRT SYSTEMS AND METHOD OF USING", filed on same date herewith and having common inventorship and assignment, now abandoned.

FIELD OF INVENTION

The present invention pertains to a method of delivering a stress relief element to a termination of high voltage electrical cable, and more particularly to use of cold-shrink technology to deliver a geometric type stress relief element to the termination.

BACKGROUND

Electrical power cables are ubiquitous and used for distributing power across vast power grids or networks, moving electricity from power generation plants to the consumers of electric power. Power cables characteristically consist of a conductor (typically copper or aluminum and typically multi-stranded tube) and may be surrounded by a semiconductor and one or more layers of insulating material. Metal wires may be wound helically around the semiconductor to serve as ground wires and a cable jacket surrounds the entire construction to protect the electrical cable. Power cables may be constructed to carry high voltages (greater than about 50,000 Volts), medium voltages (between about 1,000 Volts and about 50,000 Volts), or low voltages (less than about 1,000 Volts).

As power cables are routed across the power grids to the consumers of electric power, it is often necessary or desirable to periodically terminate the electrical cable for making a connection to electrical equipment. Typically, a termination is used to make electrical connection between the insulated electrical cable and an unshielded, un-insulated conductor. The terminator fits over an end of the insulated cable.

When a power cable is terminated, the conductor is exposed by removing some predetermined length of the cable jacket and some predetermined length of the cable semiconductor. Typically the ground wires are collected and gathered around the cable jacket to ground the semiconductor. The separation distance between the insulator and the semiconductor provides creepage distance from the live conductor, which is at 100% potential, and the grounded semiconductor, which is at 0% potential.

A termination of the electrical cable creates an abrupt discontinuity in the electrical characteristics of the cable. The termination also exposes the cable insulation to ambient conditions that most likely contains gases, moisture, and particles. The exposed conductor is also susceptible to corrosion. The discontinuity of the cable's semiconductor layer increases the maximum voltage gradient (in volts per distance, such as volts per inch) of the insulation at the semiconductor end. The discontinuity also changes the shape of the resulting electrical field and electrical stress so as to increase the risk of insulation breaking down. Thus, one function of a terminator, among others, is to compensate for the change in electrical field and electrical stress generated when there is a discontinuity in the electrical cable. The terminator also functions to protect the terminated end portion from the ambient conditions.

There are two general classes of terminators, the "wet" type and the "dry" type. In the wet type terminator, the insulating body typically contains a stress relief element, applied at the terminated end of the semiconductor layer. A suitable dielectric material, such as oil, typically fills the cavity between the cable and the inside wall of the insulating body. In the dry type terminator, the insulation body typically contains a stress relief element having an inside diameter that provides an interference fit over the cable insulation and typically over the cable semiconductor. There are two general classes of stress relief elements for use with wet or dry type terminators: (1) capacitive type stress relief element and (2) geometric type stress relief element.

A capacitive type stress relief element can be constructed from a non-compressible elastomer and is generally cylindrical tube in design. The capacitive type stress relief element relies primarily on the material selection to manage the electrical field and the electrical stresses resulting from a terminated electrical cable. A useful material should be a good insulator and have a large dielectric constant. For example, for a medium voltage (e.g., 15 kV) electrical termination, the dielectric constant for the capacitive stress relief element should be greater than about 12. For a high voltage (e.g., 69 kV) electrical termination, the dielectric constant should be greater than about 20. While the capacitive type stress relief element (often referred to colloquially as "high K tube") are useful in the low voltage and medium voltage application, they are less effective in high voltage applications. Although high K tubes are commercially available for 69 kV termination system, it is commonly understood by those skilled in the art that at the high voltages, the high K tube wall tends to rupture due to the electrical stresses.

A geometric type stress relief element relies on its geometric design as well as the material type to manage the electrical field and electrical stresses resulting from a terminated cable. In one design, the geometric stress relief element is conical in shape and contains a semiconductor electrode embedded in an insulator.

Cold-shrink technology has been used to deliver capacitive stress relief elements. For example, high K tubes have been preloaded to cold shrink tubes for 15 kV, 39 kV, and 69 kV termination systems. For example, for a 69 kV system, the capacitive type stress relief element, such as a high K tube made of EPDM having a dielectric constant of about 11 to 25, can be about 0.200 inch (5 mm) thick. The length of the high K tube is typically determined by the dielectric constant of the tube. As one skilled in the art will recognize, there are commercially available cold shrink tubes can support a 0.200 inch thick high K tube.

In high voltage electrical cables, the size of the various parts used to terminate the cable can increase considerably compared to that of the medium or low voltage terminators. This increase in size is particularly true for a geometric type stress relief element. With larger stress relief elements, it becomes more difficult to use a cold shrink tube to deliver them to the termination because of the increased compressive stress that is imposed on the tube.

The current field installation method for a geometric type stress relief element to a terminated electrical cable requires the efforts of several people and requires the use of a specialized equipment, such as a come-a-long. In a typical process, the terminated cable is lubricated and the geometric type stress relief element is pushed on to the lubricated, terminated cable, with the use of the come-a-long. This installation method is tends to be labor intensive and can be prone to installation error.

The termination also will typically contain a plurality of skirts. Traditionally, the skirts are premolded with an insulator and the combination is installed on a termination. For example, a termination that uses a porcelain housing will typically contain a predetermined number of premolded porcelain skirts to increase the distance from the top to the bottom of the termination.

Thus, there is a need to advance the installation process of geometric type stress elements to terminated high voltage electrical cables. And, there is also a need to move away from a predetermined number of skirts to give the user flexibility in installing the desired number of skirts needed to achieve a desired impulse performance for the specified voltage class.

SUMMARY

In one aspect, the present invention pertains to a method of delivering a geometric type stress relief element to an electrical cable. The electrical cable comprises a conductor that is surrounded by at least one coaxial layer of cable insulation, cable semiconductor, grounded conductive wires, and cable jacket. The method comprises the following steps: (1) terminating the electrical cable; (2) tapering the terminated electrical cable, the tapering step comprising removing a portion of the cable jacket, collecting the grounded conductive wires, and removing a portion of the cable semiconductor so that a portion of the cable insulation is exposed and protrudes from the semiconductor and a portion of the cable semiconductor is exposed and protrudes from the cable jacket; (3) providing the geometric type stress relief element preloaded on a cold shrink tube having a bore, the stress relief element comprising a semiconductor electrode embedded in an insulator; (4) placing the tapered end of the terminated electrical cable into the bore of the cold shrink tube; and (5) removing the cold shrink tube so that the stress relief element is disposed over a portion of the cable semiconductor and a portion of the cable insulation. The electrical cable is rated for supplying high voltage.

In another aspect, the present invention pertains to a modular skirt system comprising a skirt disposed on a pre-stretched tube, the combination preloaded on a cold shrink tube.

In yet another aspect, the present invention pertains to a method for the user to control the number of skirts used in a high voltage electrical cable termination. The cable termination comprises a terminated cable having exposed cable insulation. The method comprises the following steps: (1) providing a modular skirt system comprising a skirt disposed on a pre-stretched tube, the combination preloaded on a cold shrink tube; and (2) delivering the modular skirt system to the exposed cable insulation by removing the cold shrink tube so as to contract the skirt and pre-stretched tube on to the cable.

One advantage of the present invention is that it allows for delivery of a geometric type stress relief element, in this case a stress cone, to a terminated high voltage cable without using a come-a-long. The inventive delivery process is less labor intensive than the current field installation process. Because the stress cone is preloaded onto the cold shrink core, a come-a-long is not needed to install the stress cone.

Another advantage of the present invention is that it can minimize installation error of the geometric type stress relief element because the method of delivery requires simply the task of removing the cold-shrink tube.

Yet another advantage of the present invention is the convenience provided by the use of a modular skirt system and by the delivery of the modular skirt system via cold shrink technology to terminated electrical cables.

BRIEF DESCRIPTION OF THE DRAWINGS

The invention can be better described with reference to the following drawings, wherein.

The drawings are idealized, are not drawn to scale, and are intended for illustrative purposes only. All numerical values used in the detailed description below relating to dimensions are modified by the word "about".

DETAILED DESCRIPTION

In the following detailed description of the illustrative embodiments, reference is made to the accompanying drawings, which form a part hereof, and in which is shown by way of illustration specific embodiments that the invention may be practiced. It is to be understood that other embodiments may be used and structural or logical changes may be made without departing from the scope of the present invention. The following detailed description, therefore, is not to be taken in a limiting sense, and the scope of the present invention is defined by the appended claims.

Figure 1:
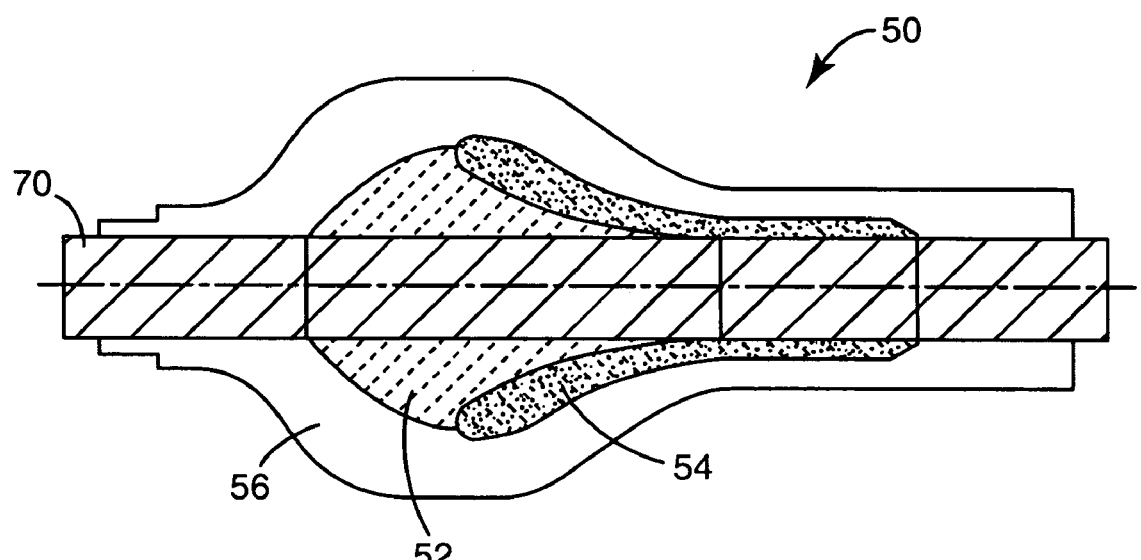
FIG. 1 is a schematic cross-sectional view of an exemplary geometric stress cone preloaded onto a cold-shrink tube for use in a dry type terminator.

Referring now to the drawings and more particularly to FIG. 1, geometric type stress relief element 50, in this case a stress cone, has been preloaded on to cold shrink tube 70. The stress relief element can be mechanically expanded and loaded onto the cold shrink tube. This particular stress relief element can be used in a dry type terminator. Stress relief element 50 has first insulator 52, semiconductor electrode 54, and second insulator 56. The stress relief element can be made using conventional techniques, such as molding. In one embodiment, the stress cone of FIG. 1 has a length of 500 millimeter (mm). The maximum thickness of the cone, as measured from its centerline, is 70 mm. The first and second insulators have a minimum dielectric constant of 2. The first and second insulators have a maximum dielectric constant of 6. The volume resistivity of the semiconductor electrode is 10,000 ohm-cm. This particular stress cone has a mass of 4 kilogram (kg).

Figure 2:
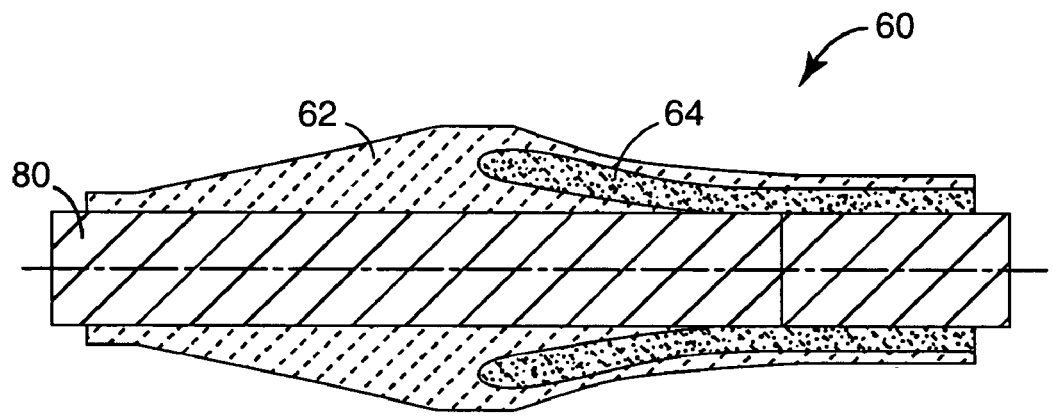
FIG. 2 is a schematic cross-sectional view of another exemplary geometric stress cone preloaded onto a cold-shrink tube for use in either a wet type or a dry type terminator.

FIG. 2 shows another exemplary geometric type stress relief element 60, also a stress cone, which has been preloaded on to cold shrink tube 80. This particular stress relief element can be used in either a dry type or a wet type terminator. Stress relief element 60 has insulator 62 and semiconductor electrode 64 and can be made using conventional techniques, such as molding. In one embodiment, the stress cone of FIG. 2 has a length of 600 mm. The maximum thickness of the cone, as measured from its centerline, is 45 to 50 mm. In one embodiment, the insulator has a minimum dielectric constant of 2. In another embodiment, the insulator has a maximum dielectric constant of 6. The volume resistivity of the semiconductor electrode is 10,000 ohm-cm. The stress cone has a mass of 2 kg.

The exemplary embodiments of FIGS. 1 and 2 are conical in design and because of the mass, they impose a substantial amount of hoop stress on the cold shrink core, as compared to a high K tube or to a splice. Splices, even those used in high voltage applications, generally are designed to distribute the mass more evenly over the entire length of the splice. A splice generally refers to that portion of the power distribution system where an incoming electrical cable is connected to at least one outgoing electrical cable.

In the embodiments of FIGS. 1 and 2, the hoop stress on the cold shrink tube is concentrated around the thickest portion of the stress cone. It can become a significant technical challenge to use cold shrink technology to deliver large components, such as stress cones of FIGS. 1 and 2, which impose large and uneven compression stress on the cold shrink tube.

In one embodiment, the geometric type stress relief element is made of an elastomeric material. As used herein, the term "elastomer" generally means thermoplastic or thermoset polymer having the ability to be stretched beyond its original length and to retract to a percent of its original length when released, preferably, to approximately its original length. Exemplary suitable elastomeric materials include silicone rubber, ethylene-propylene terpolymer (i.e., ethylene-propylene-diene monomer (EPDM) rubber), polyurethane rubber, styrene-butadiene copolymer, polychloroprene (neoprene), nitrile rubber, butyl rubber, and polysulfide rubber.

The semiconductor electrode in the geometric type stress relief element can be made by adding carbon black to the above referenced elastomers. The amount of carbon black added to the elastomer affects its conductivity. Other conductive materials can also be used in place of carbon black. In one embodiment, the minimum volume resistivity for semiconductor electrode is 50 ohm-cm. In another embodiment, the maximum volume resistivity for the semiconductor electrode is 10,000 ohm-cm. One skilled in the art can determine the amount of carbon black or other conductive material that needs to be added to the elastomer to achieve the desired volume resisitivity.

Figure 3:
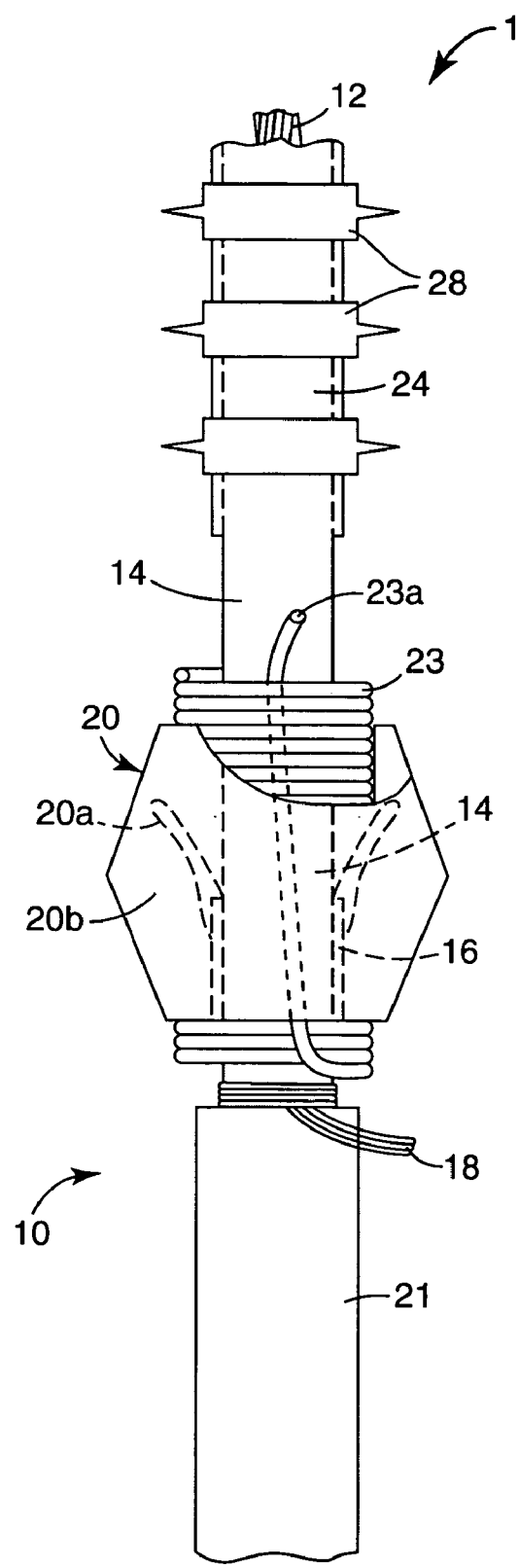
FIG. 3 is a plan view, with portions in cross-section of an electrical cable inserted inside a cold-shrink tube that is supporting a geometric stress cone as part of a terminator.

FIG. 3 shows a portion of an exemplary terminator 1 for use with high voltage electrical cable 10 that has been terminated at one end. This figure shows the delivering of the stress cone in process. The electrical cable contains central conductor 12 surrounded by coaxial layer of insulation 14. Semiconductor 16 coaxially surrounds the insulation. Ground wires 18 surround the semiconductor and cable jacket 21 surrounds the ground wires. The terminated electrical cable has been tapered such that a portion cable jacket has been removed to expose a portion of the cable semiconductor, the ground wires have been collected and gathered, and a portion of the semiconductor has been removed to expose a portion the insulation. Typically, the ground wires are formed into a ground lead for connection to a grounded terminal. If desired, a semi-conductive material may be applied to the exposed cable insulation to extend the cable semiconductor. The semiconductor material may be sprayed or painted on the cable insulation at an area that is proximate to the cable semiconductor. An exemplary semiconductive material may contain graphite.

The terminated electrical cable lies inside the bore of cold shrink tube 23. Stress cone 20 has been preloaded on to the cold shrink tube. When preloaded onto the cold shrink tube, the stress relief element is in an expanded condition and exerts compressive stress (also referred to as "hoop stress") on the tube. The stress cone also includes semiconductor electrode 20a embedded in insulation 20b. The stress cone, with its accompanying cold shrink tube, is positioned approximately over the cable insulation and the cable semiconductor.

During installation of the stress cone to the terminated and tapered electrical cable, the cold shrink tube is removed by pulling on continuous strip 23a. As the strip is pulled, the cold shrink tube is progressively unwound and the stress cone progressively contracts to grip the underlying peripheral surfaces of the cable insulation and the cable semiconductor. When the stress relief element is installed on to the terminated cable, semiconductor electrode 20a of the stress cone is in contact with semiconductor 16 of the electrical cable. In one embodiment, the semiconductor electrode of the stress cone contacts the cable semiconductor in such a manner that the former effectively extends the latter so that the equipotential lines emanating from the terminated electrical cable is better managed so as to minimize their concentration.

FIG. 3 also shows a number of skirts 28 mounted on the exposed insulation of the tapered electrical cable. Skirts function as insulators and they are effective in extending the distance that current must travel from one end of the terminator to the other end. The skirts can be mounted, one at a time, by pushing them onto the cable insulation. An alternative method is discussed below in conjunction with FIG. 4 where a modular skirt system is used. In one embodiment, the skirt material is fabricated from the elastomers listed above. As one skilled in the art will recognize, the number of skirts used depends on the desired impulse performance for the voltage class.

Figure 4:
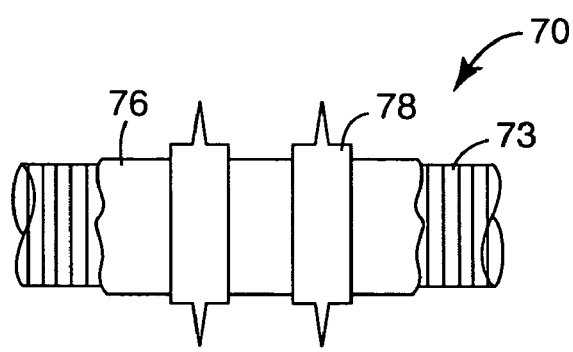
FIG. 4 is a schematic cross sectional view of an exemplary modular two skirt system for use in high voltage electrical cables where the skirt have been preloaded on to a cold-shrink tube.

Turning now to FIG. 4, there is shown a modular two-skirt system. Skirts 78 are loaded on to pre-stretched tubes 76, and the combination is loaded to cold shrink tube 73. In one embodiment, a mechanical method is used to load the skirt on to the pre-stretched tube. Although a modular two-skirt system is shown, any number of skirts can loaded to the pre-stretched tubes. For example, other systems could include modular four-skirt, modular six-skirt, and modular eight-skirt systems. An odd number of skirts can also be used.

In one embodiment, the pre-stretched tube is fabricated from the elastomers listed above. The pre-stretched tube generally is cylindrical in design having substantially uniform wall thickness along its length. If a lubricant is used during the installation of the modular skirt system to the terminated cable, the lubricant is substantially not absorbed by the cable insulation or by the pre-stretched tube.

An advantage of the modular skirt design is that it allows the user to install the desired number of skirts to the termination to achieve the desired impulse requirement for the particular voltage class. Thus, the modular skirt reduces the need to hold in inventory insulators that have predetermined numbers of skirts molded as part of the insulator as previously done. For example, the user does not have to inventory separately premolded one skirt, premolded two skirts, premolded three skirts, and so on, systems. By "premolding", it is meant that the skirt and the, such as a pre-stretched tube, are molded as one unit. With the modular skirts, the user has the flexibility to expand the number of skirts to meet the impulse requirements. Another advantage of the modular skirt system is that it is easy to deliver to the terminated electrical cable through the use of the cold shrink tube.

Various other steps may be needed to complete the installation of the terminator. For example hardware, such as mechanical devices, may be needed to be installed onto the terminated electrical cable. Also, lubricants can be applied to the terminated cable before installing the stress relief element and before installing the skirts or the modular skirt systems. A suitable lubricant is one that is not substantially absorbed by the cable insulation, by the cable semiconductor, or by the stress relief element.

Now turning to the cold shrink tube for use in the present invention, it is generally cylindrical. In one exemplary embodiment, the cold shrink tube is helically grooved along its length. The continuous grooves permit the cold-shrink tube to be pulled out into a continuous ribbon, which is removed through the bore of the cold-shrink tube, i.e., between the tube and the electrical cable. Suitable cold-shrink tubes are disclosed in U.S. Pat. No. 3,515,798 (Sievert); U.S. Pat. No. 5,670,223 (Sadlo et al.); and U.S. Pat. No. 5,925,417 (Sadlo et al.).

A particularly useful cold shrink tube is disclosed in FIG. 6 of U.S. Pat. No. 5,925,417 because of its ability to withstand greater pressure. FIG. 6 shows a cold shrink tube made from a ribbon 30 having a support member 50. Therein, it is stated that the support member 50 extends longitudinally along the length of the ribbon 30. Support member 50 preferably has greater strength and temperature resistance than the material forming the remainder of ribbon 30. The inclusion of support member 50 in ribbon 30 creates a tube that exhibits increased resistance to premature collapse when subject to high pressure of large diameter stretched elastic objects, such as that of a geometric stress relief element for a high voltage cable. Support member 50 can be a thermoplastic material, such as ABS (acrylonitrile-butadiene-styrene terpolymer) resin while the remainder of ribbon 30 is formed of a thermoplastic material, such as a polyolefin resin. In one embodiment, support member 50 is coextruded with the body of ribbon 30. Other methods of forming ribbon 30 may be recognized by those skilled in the art and are within the scope of the present invention.

What is claimed is:

1. A method of delivering stress relief to an electrical cable of the type comprising a conductor surrounded by at least one coaxial layer of cable insulation, cable semiconductor, grounded conductive wires, and cable jacket, the method comprising the steps of:
   terminating the electrical cable;
   tapering the terminated electrical cable, the tapering step comprising
   removing a portion of the cable jacket,
   collecting the grounded conductive wires, and
   removing a portion of the cable semiconductor so that a portion of the cable insulation is exposed and protrudes from the semiconductor and a portion of the cable semiconductor is exposed and protrudes from the cable jacket;
   providing a geometric type stress relief element preloaded on a cold shrink tube having a bore, the geometric type stress relief element comprising a semiconductor electrode embedded in an insulator;
   placing the tapered end of the terminated electrical cable into the bore of the cold shrink tube; and
   removing the cold shrink tube from the bore of the geometric type stress relief element so that the geometric type stress relief element is disposed over a portion of the cable semiconductor and a portion of the cable insulation;
   wherein the electrical cable is rated for supplying a voltage equal to or greater than 69 kV.

2. The method of claim 1, wherein after the removing the cold shrink tube step, the semiconductor electrode of the stress relief element contacts the cable semiconductor.

3. The method of claim 1, wherein after the tapering the terminated electrical cable step, the method further comprises a step of applying a coating of semi-conductive material on a portion of the exposed cable insulation proximate to the cable semiconductor.

4. The method of claim 3, wherein the coating of semi-conductive material is applied via spray painting.

5. The method of claim 4, wherein the semi-conductive material comprises graphite.

6. The method of claim 1, wherein after the terminating the electrical cable step, the method further comprises the step of installing at least one skirt onto the cable insulation.

7. The method of claim 6, wherein at least one of the skirt and pre-stretched tube is made from a polymeric material selected from the group consisting of silicone rubber, ethylene-propylene terpolymer, polyurethane rubber, styrene-butadiene copolymer, polychloroprene, nitrile rubber, butyl rubber, polysulfide rubber, and combinations thereof.

8. The method of claim 1, wherein before the placing the tapered end of the terminated electrical cable into the bore of the cold shrink tube step, the method further comprises a step of applying a lubricant to at least a portion of the cable semiconductor and at least a portion of the cable insulation.

9. The method of claim 8, wherein the lubricant is substantially not absorbed by the cable insulation, the cable semiconductor, or the geometric stress relief element.

10. The method of claim 1, wherein the insulator of the geometric stress relief element is made from a polymeric material selected from the group consisting of silicone rubber, ethylene-propylene terpolymer, polyurethane rubber, styrene-butadiene copolymer, polychloroprene, nitrile rubber, butyl rubber, polysulfide rubber, and combinations thereof.

11. The method of claim 1, wherein the semiconductor electrode of the geometric stress relief element is made from a polymeric material comprising carbon black, the polymeric material selected from the group consisting of silicone rubber, ethylene-propylene terpolymer, polyurethane rubber, styrene-butadiene copolymer, polychloroprene, nitrile rubber, butyl rubber, polysulfide rubber, and combinations thereof.

12. The method of claim 1, wherein the insulator of the stress relief element has a dielectric constant of greater than about 2.

13. The method of claim 1, wherein the insulator of the stress relief element has a dielectric constant of less than about 6.

14. The method of claim 1, wherein the semiconductor electrode of the stress relief element has a minimum volume resistivity of greater than about 50 ohm-cm.

15. The method of claim 1, wherein the semiconductor electrode of the stress relief element has a maximum volume resistivity of less than about 10,000 ohm-cm.

16. The method of claim 1, wherein the cold shrink tube comprises a support member that extends longitudinally along its length.

17. The method of claim 16, wherein the support member is coextruded with the cold shrink tube.

18. The method of claim 17, wherein the support member is a polymer made of acrylonitrile-butadeine-styrene monomer.

19. The method of claim 1 for use in a wet type or a dry type termination.

20. The method of claim 1, wherein the geometric type stress relief element has a varying diameter cross-section along a length where the semiconductor electrode is embedded in the insulator.

* * * * *

UNITED STATES PATENT AND TRADEMARK OFFICE
CERTIFICATE OF CORRECTION

PATENT NO. : 7,251,881 B2  Page 1 of 1
APPLICATION NO. : 10/964956
DATED : August 7, 2007
INVENTOR(S) : Nga K. Nguyen et al.

It is certified that error appears in the above-identified patent and that said Letters Patent is hereby corrected as shown below:

Column 1,
Line 10, delete "USING"," and insert --USING" having attorney docket number 60242US002,--, therefor.

Column 8,
Line 57, Claim 18, delete "butadeine" and insert --butadiene--, therefor.

Signed and Sealed this

Third Day of June, 2008

JON W. DUDAS
*Director of the United States Patent and Trademark Office*